Figure 1:
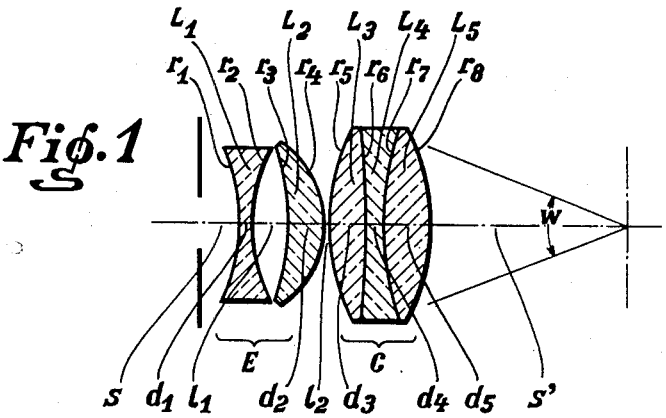

May 5, 1953   M. LUDEWIG   2,637,245
EYEPIECE FOR OPTICAL INSTRUMENTS
Filed Oct. 11, 1950   2 SHEETS—SHEET 1

INVENTOR.
Maximilian Ludewig
BY
Fred A. Klein
his attorney

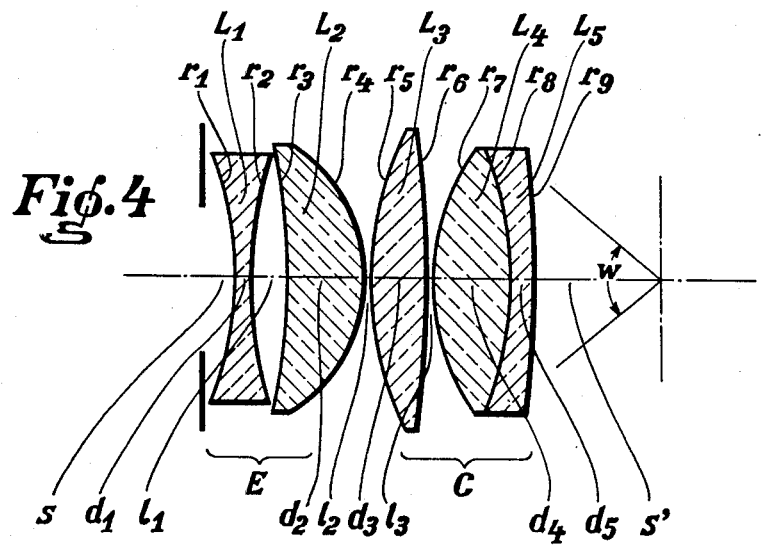
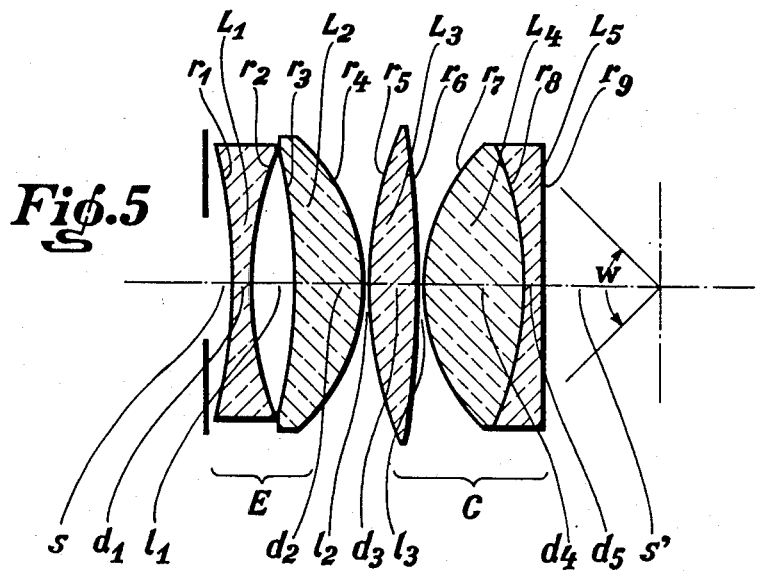

Patented May 5, 1953

2,637,245

UNITED STATES PATENT OFFICE 2,637,245

EYEPIECE FOR OPTICAL INSTRUMENTS

Maximilian Ludewig, Wetzlar, Germany, assignor to Ernst Leitz, G. m. b. H., Wetzlar, Germany, a corporation of Germany Application October 11, 1950, Serial No. 189,497
In Germany October 31, 1949

8 Claims. (Cl. 88—57)

The present invention relates to optical instruments, and more particularly to eyepieces for telescopes whose exit pupils are far removed from the last lens and yet, have an exceptionally large apparent field of view. Such eyepieces are of importance in connection with telescopic sights and also with wide angle field glasses.

In telescopic sights of known construction, the exit pupil is placed at a rather large distance from the last eyepiece lens, this condition being a result of the nature of the instruments on which telescopic sights are used. However, this distance is not effected by the members of the eyepiece alone but, is known devices, can be created only in connection with the other optical members of the telescopic sight. Another disadvantage of prior sights of this nature lies in the fact that the apparent field of view does not exceed 20° to 25°, and this is particularly unsatisfactory if the user looks first through an ordinary field glass with approximately 45° of view and immediately thereafter through a telescopic sight.

It is an object of the present invention to provide a telescopic sight with increased apparent field of view.

It is a further object of this invention to provide a telescopic sight whose eyepiece alone effects a large distance of the pupil, i. e. a distance of about one and a half times the entire focal length.

It is also an object of the invention to provide a field glass eyepiece having a distance of the pupil of about 80% of the focal length while assuring a large apparent field of view up to 90°.

The above and other objects and advantages are accomplished in accordance with the present invention by providing, in an eyepiece, an optical component of negative or at least large positive focal length near the diaphragm, said component comprising first a bi-concave negative lens and then a positive meniscus whose surface of greater curvature is located at the side of the observer's eye. This optical component is followed, in the direction of the eye, by a positive optical component.

The first three dispersing lens surfaces nearest the plane of the diaphragm are strongly curved whereby the exit pupil is far removed from the last lens. The total Petzval sum of the above described optical system of the invention is very small because the negative Petzval sum of the first-mentioned optical component and the positive sum of the second-mentioned optical component almost balance each other. Furthermore, the optical component near the diaphragm makes it possible to overcompensate the sagittal curvature of the field so that it balances that of the objective of the telescope.

The aforementioned positive optical component comprises preferably at least three elements of which at least two may be cemented together. In a three-lens positive component the lens nearest the diaphragm must be bi-convex, have a focal length between 1.8 and 4 times the total focal length, and in addition, the larger radius of the lens, which may, in the extreme, be infinite, must be located at the side of the viewer's eye. The bi-convex element is followed by a negative and a positive lens, in this or reversed order, and the latter two lenses may be cemented together. If desired, the bi-convex lens may be cemented to the negative lens. If the bi-convex lens element is followed by a positive lens, the radius of the positive lens surface facing the diaphragm should not exceed 1.5 times the total focal length.

While the general principles of the invention have been described above, it also includes the specific calculated optical systems recited in some of the claims. It will become apparent from these particular embodiments that the invention gives excellent results if the focal length of the optical component near the diaphragm is negative or comparatively large positive.

The invention is illustrated in, but not limited by, the accompanying drawings showing five embodiments of the optical system of the invention.

Figure 2:
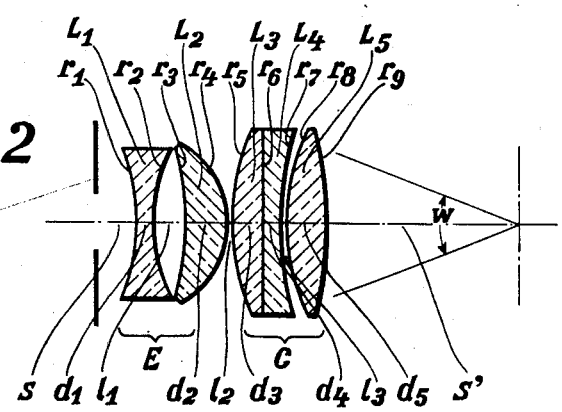
Figure 3:
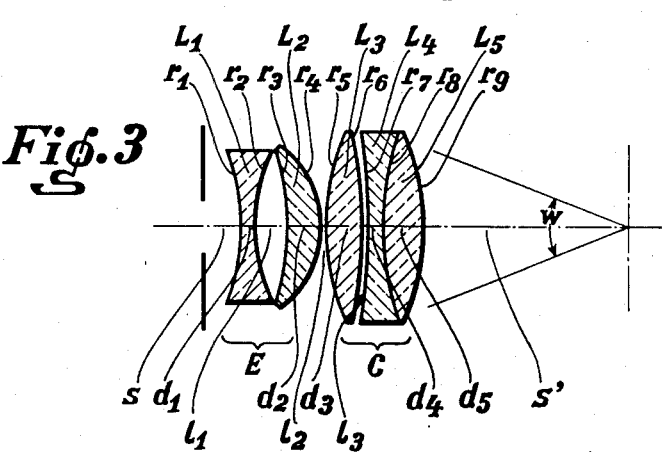

In the drawing,

Figs. 1 to 3 show eyepieces whose optical components nearest the observer's eye are differently constructed and which are adapted for use with telescopic sights; and Figs. 4 and 5 show wide angle eyepieces in accordance with the invention.

The five figures of the drawing refer to the systems recited in respective claims 1 through 5. The symbols used in the examples, drawings and claims signify the following:

$r$ = radius of curvature
$d$ = thickness of lens
$e$ = distance between lenses $L_1$, $L_2$, $L_3$, $L_4$ and $L_5$
$n$ = index of refraction of the glass
$\nu$ = Abbé's number of the glass
$F$ = total focal length
$f_1$ = focal length of the optical component E near the diaphragm
$f_2$ = focal length of the first lens $L_1$
$f_3$ = focal length of the third lens $L_3$
$s$ = distance of the diaphragm from the vertex of the first lens
$s'$ = distance of the exit pupil from the vertex of the last lens $L_5$
$w$ = angle of the apparent field of view

Example I

An eyepiece constructed in accordance with Fig. 1 and characterized by the following data:

| | | | $n/\nu$ |
|---|---|---|---|
| $r_1 = -118.9$ | $d_1 = 10.1$ | | 1.7283/28.3 |
| $r_2 = +118.9$ | | $e_1 = 20.03$ | |
| $r_3 = -200.3$ | $d_2 = 26.29$ | | 1.5163/64.0 |
| $r_4 = -60.08$ | | $e_2 = 0.25$ | |
| $r_5 = +130.2$ | $d_3 = 25.03$ | | 1.6204/60.3 |
| $r_6 = -938.8$ | | | |
| $r_7 = +182.7$ | $d_4 = 12.52$ | | 1.7283/28.3 |
| $r_8 = -142.7$ | $d_5 = 28.79$ | | 1.6204/60.3 |

| $F = 100$ | $s = -24.3$ |
|---|---|
| $f_1 = -419.41$ | $s' = +137.5$ |
| $f_2 = -80.1$ | $w = 42°$ |
| $f_3 = +186.0$ | |

Example II

An eyepiece constructed in accordance with Fig. 2 and characterized by the following data:

| | | | $n/\nu$ |
|---|---|---|---|
| $r_1 = -137.4$ | $d_1 = 9.99$ | | 1.7283/28.3 |
| $r_2 = +119.91$ | | $e_1 = 19.99$ | |
| $r_3 = -200.33$ | $d_2 = 26.23$ | | 1.5163/64.0 |
| $r_4 = -62.05$ | | $e_2 = 0.25$ | |
| $r_5 = +142.4$ | $d_3 = 24.98$ | | 1.5163/64.0 |
| $r_6 = \infty$ | | | |
| $r_7 = +257.3$ | $d_4 = 12.49$ | | 1.7283/28.3 |
| $r_8 = +119.9$ | | $e_3 = 0.25$ | |
| $r_9 = -243.3$ | $d_5 = 28.73$ | | 1.6204/60.3 |

| $F = 100$ | $s = -25.15$ |
|---|---|
| $f_1 = -441.98$ | $s' = +132.44$ |
| $f_2 = -86.8$ | $w = 42°$ |
| $f_3 = +276.0$ | |

Example III

An eyepiece constructed in accordance with Fig. 3 and characterized by the following data:

| | | | $n/\nu$ |
|---|---|---|---|
| $r_1 = -133.1$ | $d_1 = 9.88$ | | 1.7283/28.3 |
| $r_2 = +120.8$ | | $e_1 = 19.76$ | |
| $r_3 = -198.0$ | $d_2 = 25.93$ | | 1.5163/64.0 |
| $r_4 = -61.7$ | | $e_2 = 0.25$ | |
| $r_5 = +142.3$ | $d_3 = 24.70$ | | 1.5163/64.0 |
| $r_6 = -271.7$ | | $e_3 = 0.25$ | |
| $r_7 = -819.4$ | $d_4 = 12.35$ | | 1.7283/28.3 |
| $r_8 = +185.7$ | $d_5 = 28.40$ | | 1.6204/60.3 |
| $r_9 = -138.3$ | | | |

| $F = 100$ | $s = -23.8$ |
|---|---|
| $f_1 = -439.63$ | $s' = +136.3$ |
| $f_2 = -85.53$ | $w = 42°$ |
| $f_3 = +184.63$ | |

Example IV

An eyepiece constructed in accordance with Fig. 4 and characterized by the following data:

| | | | $n/\nu$ |
|---|---|---|---|
| $r_1 = -232.7$ | $d_1 = 11.22$ | | 1.7283/28.3 |
| $r_2 = +263.4$ | | $e_1 = 22.45$ | |
| $r_3 = -404.0$ | $d_2 = 50.87$ | | 1.5687/63.1 |
| $r_4 = -102.5$ | | $e_2 = 0.75$ | |
| $r_5 = +209.5$ | $d_3 = 41.15$ | | 1.5687/63.1 |
| $r_6 = -838.3$ | | $e_3 = 0.75$ | |
| $r_7 = +133.9$ | | | |
| $r_8 = -190.8$ | $d_4 = 56.11$ | | 1.6204/60.3 |
| $r_9 = +1876.4$ | $d_5 = 11.97$ | | 1.7283/28.3 |

| $F = 100$ | $s = -16.17$ |
|---|---|
| $f_1 = -5264.6$ | $s' = +86.5$ |
| $f_2 = -168.04$ | $w = 78°$ |
| $f_3 = +321.4$ | |

Example V

An eyepiece constructed in accordance with Fig. 5 and characterized by the following data:

| | | | $n/\nu$ |
|---|---|---|---|
| $r_1 = -305.1$ | $d_1 = 11.09$ | | 1.7283/28.3 |
| $r_2 = +260.7$ | | $e_1 = 27.73$ | |
| $r_3 = -402.1$ | $d_2 = 48.07$ | | 1.6923/54.7 |
| $r_4 = -124.8$ | | $e_2 = 0.92$ | |
| $r_5 = +200.3$ | $d_3 = 33.28$ | | 1.5687/63.1 |
| $r_6 = -739.6$ | | $e_3 = 0.92$ | |
| $r_7 = +125.7$ | | | |
| $r_8 = -214.5$ | $d_4 = 70.26$ | | 1.6204/60.3 |
| $r_9 = \infty$ | $d_5 = 11.09$ | | 1.7283/28.3 |

| $F = 100$ | $s = -17.97$ |
|---|---|
| $f_1 = +2835.8$ | $s' = +78.05$ |
| $f_2 = -191.4$ | $w = 90°$ |
| $f_3 = +370.9$ | |

While the invention has been described and illustrated with reference to certain preferred embodiments, it is to be clearly understood that various modifications and variations may occur to those skilled in the art without departing from the spirit and scope of the invention as defined in the appended claims.

What is claimed is:

1. An eyepiece for a telescope having a large distance from the exit pupil to the last lens of the eyepiece and comprising, in this order of construction, a diaphragm, an optical component consisting of an unattached bi-concave negative lens and a positive meniscus shaped lens positioned with its surface of greater curvature located on the side of the observer's eye, with the first three surfaces nearest the diaphragm strongly curved, the focal length of the biconcave lens being between ½ and 2F and the focal length of the entire component being between 4F and infinity, the focal length of the eyepiece being F, and a following positive optical component comprising at least three lenses of which at least two are cemented together, said positive component including a positive lens nearest the meniscus shaped lens and being followed by a negative and a positive lens.

2. An eyepiece as defined in claim 1 wherein the focal length of the first-mentioned optical component is negative.

3. An eyepiece as defined in claim 1 wherein the first-mentioned optical component has a large positive focal length.

4. An eyepiece for a telescope having a large distance from the exit pupil to the last lens of the eyepiece and comprising, in this order of construction, a diaphragm, an optical component consisting of an unattached bi-concave negative lens and a positive meniscus whose surface of greater curvature is on the side of the eye of an observer, and a positive optical component near the eye, characterized by the following data as applied to the optical system shown in Fig. 1:

|  |  |  | n/ν |
|---|---|---|---|
| $r_1 = -118.9$ | $d_1 = 10.1$ |  | 1.7283/28.3 |
| $r_2 = +118.9$ |  | $e_1 = 20.30$ |  |
| $r_3 = -200.3$ | $d_2 = 26.29$ |  | 1.5163/64.0 |
| $r_4 = -60.08$ |  | $e_2 = 0.25$ |  |
| $r_5 = +130.2$ | $d_3 = 25.03$ |  | 1.6204/60.3 |
| $r_6 = -938.8$ | $d_4 = 12.52$ |  | 1.7283/28.3 |
| $r_7 = +182.7$ | $d_5 = 28.79$ |  | 1.6204/60.3 |
| $r_8 = -142.7$ |  |  |  |
| $F = 100$ |  | $s = -24.3$ |  |
| $f_1 = -419.41$ |  | $s' = +137.5$ |  |
| $f_2 = -80.1$ |  | $w = 42°$ |  |
| $f_3 = +186.0$ |  |  |  | wherein $r$ are the radii of curvature of the lenses, $d$ are the thicknesses of the lenses, $e$ are the axial distances of the lenses, $n$ is the index of refraction and $\nu$ is Abbé's number of the lens glass, F is the total focal length, $f_1$ is the focal length of the optical component E near the diaphragm, $f_2$ is the focal length of the first lens $L_1$, $f_3$ is the focal length of the third lens $L_3$, $s$ is the distance of the diaphragm from the vertex of the first lens, $s'$ is the distance of the exit pupil from the vertex of the last lens, and $w$ is the angle of the apparent field of view.

5. An eyepiece for a telescope having a large distance from the exit pupil to the last lens of the eyepiece and comprising, in this order of construction, a diaphragm, an optical component consisting of an unattached bi-concave negative lens and a positive meniscus whose surface of greater curvature is on the side of the eye of an observer, and a positive optical component near the eye, characterized by the following data as applied to the optical system shown in Fig. 2:

|  |  |  | n/ν |
|---|---|---|---|
| $r_1 = -137.4$ | $d_1 = 9.99$ |  | 1.7283/28.3 |
| $r_2 = +119.91$ |  | $e_1 = 19.99$ |  |
| $r_3 = -200.33$ | $d_2 = 26.23$ |  | 1.5163/64.0 |
| $r_4 = -62.05$ |  | $e_2 = 0.25$ |  |
| $r_5 = +142.4$ | $d_3 = 24.98$ |  | 1.5163/64.0 |
| $r_6 = \infty$ | $d_4 = 12.49$ |  | 1.7283/28.3 |
| $r_7 = +257.3$ |  | $e_3 = 0.25$ |  |
| $r_8 = +119.9$ | $d_5 = 28.73$ |  | 1.6204/60.3 |
| $r_9 = -243.3$ |  |  |  |
| $F = 100$ |  | $s = -25.15$ |  |
| $f_1 = -441.98$ |  | $s_1 = +132.44$ |  |
| $f_2 = -86.8$ |  | $w = 42°$ |  |
| $f_3 = +276.0$ |  |  |  | wherein $r$ are the radii of curvature of the lenses, $d$ are the thicknesses of the lenses, $e$ are the axial distances of the lenses, $n$ is the index of refraction and $\nu$ is Abbé's number of the lens glass, F is the total focal length, $f_1$ is the focal length of the optical component E near the diaphragm, $f_2$ is the focal length of the first lens $L_1$, $f_3$ is the focal length of the third lens $L_3$, $s$ is the distance of the diaphragm from the vertex of the first lens, $s'$ is the distance of the exit pupil from the vertex of the last lens, and $w$ is the angle of the apparent field of view.

6. An eyepiece for a telescope having a large distance from the exit pupil to the last lens of the eyepiece and comprising, in this order of construction, a diaphragm, an optical component consisting of an unattached bi-concave negative lens and a positive meniscus whose surface of greater curvature is on the side of the eye of an observer, and a positive optical component near the eye, characterized by the following data as applied to the optical system shown in Fig. 3:

|  |  |  | n/ν |
|---|---|---|---|
| $r_1 = -133.1$ | $d_1 = 9.88$ |  | 1.7283/28.3 |
| $r_2 = +120.8$ |  | $e_1 = 19.76$ |  |
| $r_3 = -198.0$ | $d_2 = 25.93$ |  | 1.5163/64.0 |
| $r_4 = -61.7$ |  | $e_2 = 0.25$ |  |
| $r_5 = +142.3$ | $d_3 = 24.70$ |  | 1.5163/64.0 |
| $r_6 = -271.7$ |  | $e_3 = 0.25$ |  |
| $r_7 = -819.4$ | $d_4 = 12.35$ |  | 1.7283/28.3 |
| $r_8 = +185.7$ | $d_5 = 28.40$ |  | 1.6204/60.3 |
| $r_9 = -138.3$ |  |  |  |
| $F = 100$ |  | $s = -23.8$ |  |
| $f_1 = -439.63$ |  | $s_1 = +136.3$ |  |
| $f_2 = -85.53$ |  | $w = 42°$ |  |
| $f_3 = +184.63$ |  |  |  | wherein $r$ are the radii of curvature of the lenses, $d$ are the thicknesses of the lenses, $e$ are the axial distances of the lenses, $n$ is the index of refraction and $\nu$ is Abbé's number of the lens glass, F is the total focal length, $f_1$ is the local length of the optical component E near the diaphragm, $f_2$ is the focal length of the first lens $L_1$, $f_3$ is the focal length of the third lens $L_3$, $s$ is the distance of the diaphragm from the vertex of the first lens, $s'$ is the distance of the exit pupil from the vertex of the last lens, and $w$ is the angle of the apparent field of view.

7. An eyepiece for a telescope having a large distance from the exit pupil to the last lens of the eyepiece and comprising, in this order of construction, a diaphragm, an optical component consisting of an unattached biconcave negative lens and a positive meniscus whose surface of greater curvature is on the side of the eye of an observer, and a positive optical component near the eye, characterized by the following data as applied to the optical system shown in Fig. 4:

|  |  |  | $n/\nu$ |
|---|---|---|---|
| $r_1 = -232.7$ | $d_1 = 11.22$ |  | 1.7283/28.3 |
| $r_2 = +263.4$ |  | $e_1 = 22.45$ |  |
| $r_3 = -404.0$ | $d_2 = 50.87$ |  | 1.5687/63.1 |
| $r_4 = -102.5$ |  | $e_2 = 0.75$ |  |
| $r_5 = +209.5$ | $d_3 = 41.15$ |  | 1.5687/63.1 |
| $r_6 = -838.3$ |  | $e_3 = 0.75$ |  |
| $r_7 = +133.9$ | $d_4 = 56.11$ |  | 1.6204/60.3 |
| $r_8 = -190.8$ | $d_5 = 11.07$ |  | 1.7283/28.3 |
| $r_9 = +1876.4$ |  |  |  |
| $F = 100$ |  | $s = -16.17$ |  |
| $f_1 = -5264.6$ |  | $s' = +86.5$ |  |
| $f_2 = -168.04$ |  | $w = 78°$ |  |
| $f_3 = +321.4$ |  |  |  | wherein $r$ are the radii of curvature of the lenses, $d$ are the thicknesses of the lenses, $e$ are the axial distances of the lenses, $n$ is the index of refraction and $\nu$ is Abbé's number of the lens glass, F is the total focal length, $f_1$ is the focal length of the optical component E near the diaphragm, $f_2$ is the focal length of the first lens $L_1$, $f_3$ is the focal length of the third lens $L_3$, $s$ is the distance of the diaphragm from the vertex of the first lens, $s'$ is the distance of the exit pupil from the vertex of the last lens, and $w$ is the angle of the apparent field of view.

8. An eyepiece for a telescope having a large distance from the exit pupil to the last lens of the eyepiece and comprising, in this order of construction, a diaphragm, an optical component consisting of an unattached bi-concave negative lens and a positive meniscus whose surface of greater curvature is on the side of the eye of an observer, and a positive optical component near the eye, characterized by the following data as applied to the optical system shown in Fig. 5:

|  |  |  | $n/\nu$ |
|---|---|---|---|
| $r_1 = -305.1$ | $d_1 = 11.09$ |  | 1.7283/28.3 |
| $r_2 = +260.7$ |  | $e_1 = 27.73$ |  |
| $r_3 = -402.1$ | $d_2 = 48.07$ |  | 1.6923/54.7 |
| $r_4 = -124.8$ |  | $e_2 = 0.92$ |  |
| $r_5 = +290.3$ | $d_3 = 33.28$ |  | 1.5687/63.1 |
| $r_6 = -739.6$ |  | $e_3 = 0.92$ |  |
| $r_7 = +125.7$ | $d_4 = 70.26$ |  | 1.6204/60.3 |
| $r_8 = -214.5$ | $d_5 = 11.09$ |  | 1.7283/28.3 |
| $r_9 = \infty$ |  |  |  |
| $F = 100$ |  | $s = -17.97$ |  |
| $f_1 = +2835.8$ |  | $s' = +78.05$ |  |
| $f_2 = -191.4$ |  | $w = 90°$ |  |
| $f_3 = +370.9$ |  |  |  | wherein $r$ are the radii of curvature of the lenses, $d$ are the thicknesses of the lenses, $e$ are the axial distances of the lenses, $n$ is the index of refraction and $\nu$ is Abbé's number of the lens glass, F is the total focal length, $f_1$ is the focal length of the optical component E near the diaphragm, $f_2$ is the focal length of the first lens $L_1$, $f_3$ is the focal length of the third lens $L_3$, $s$ is the distance of the diaphragm from the vertex of the first lens, $s'$ is the distance of the exit pupil from the vertex of the last lens, and $w$ is the angle of the apparent field of view.

MAXIMILIAN LUDEWIG.

References Cited in the file of this patent

UNITED STATES PATENTS

| Number | Name | Date |
|---|---|---|
| 967,143 | Arriaga | Aug. 9, 1910 |
| 1,468,762 | Taylor et al. | Sept. 25, 1923 |
| 1,478,704 | Erfle | Dec. 25, 1923 |
| 1,968,222 | Richter | July 31, 1934 |
| 2,394,635 | Reiss | Feb. 12, 1946 |
| 2,419,151 | Miles | Apr. 15, 1947 |
| 2,423,676 | Altman | July 8, 1947 |

FOREIGN PATENTS

| Number | Country | Date |
|---|---|---|
| 178,436 | Great Britain | Jan. 11, 1923 |
| 492,174 | Germany | Feb. 22, 1930 |